US011358126B2

(12) United States Patent
Joo et al.

(10) Patent No.: US 11,358,126 B2
(45) Date of Patent: Jun. 14, 2022

(54) PT—N—C BASED ELECTROCHEMICAL CATALYST FOR CHLORINE EVOLUTION REACTION AND PRODUCTION METHOD THEREOF

(71) Applicant: UNIST (ULSAN NATIONAL INSTITUTE OF SCIENCE AND TECHNOLOGY), Ulsan (KR)

(72) Inventors: Sang Hoon Joo, Ulsan (KR); Tae Jung Lim, Ulsan (KR)

(73) Assignee: UNIST (ULSAN NATIONAL INSTITUTE OF SCIENCE AND TECHNOLOGY)

( * ) Notice: Subject to any disclaimer, the term of this patent is extended or adjusted under 35 U.S.C. 154(b) by 230 days.

(21) Appl. No.: 16/791,281

(22) Filed: Feb. 14, 2020

(65) Prior Publication Data
US 2021/0060535 A1 Mar. 4, 2021

(30) Foreign Application Priority Data
Sep. 2, 2019 (KR) .......................... 10-2019-0107891

(51) Int. Cl.
B01J 23/42 (2006.01)
B01J 37/04 (2006.01)
C25B 1/26 (2006.01)
C25B 1/02 (2006.01)
B01J 37/08 (2006.01)
B01J 21/18 (2006.01)

(52) U.S. Cl.
CPC ............... B01J 23/42 (2013.01); B01J 37/04 (2013.01); B01J 37/08 (2013.01); C25B 1/02 (2013.01); C25B 1/26 (2013.01); B01J 21/18 (2013.01)

(58) Field of Classification Search
CPC ... B01J 23/42; B01J 37/04; B01J 37/08; B01J 21/18; B01J 31/22; B01J 35/006; B01J 2531/828; C25B 1/02; C25B 1/26; C25B 1/04; C25B 1/34; C25B 11/065; C25B 11/085; C25B 11/054; Y02E 60/36
See application file for complete search history.

(56) References Cited

FOREIGN PATENT DOCUMENTS

| JP | 2006-247523 A | | 9/2006 |
| KR | 10-2012-0136442 | | 12/2012 |
| KR | 10-2016-0044982 | | 4/2016 |
| KR | 10-2018-0013499 A | | 2/2018 |
| KR | 10-2019-0034897 | | 4/2019 |
| KR | 20190034897 A | * | 4/2019 |

* cited by examiner

Primary Examiner — Anthony J Zimmer
Assistant Examiner — Logan Edward Laclair
(74) Attorney, Agent, or Firm — Workman Nydegger

(57) ABSTRACT

The present invention relates to a Pt—N—C based electrochemical catalyst for chlorine evolution reaction and a production method thereof, and an aspect of the present invention provides a Pt—N—C based electrochemical catalyst including: a carbon support; and an organic compound including Pt and N distributed on the carbon support.

15 Claims, 13 Drawing Sheets

PT—N—C BASED ELECTROCHEMICAL CATALYST FOR CHLORINE EVOLUTION REACTION AND PRODUCTION METHOD THEREOF

CROSS-REFERENCE TO RELATED APPLICATION(S)

This application claims the priority of Korean Patent Application No. 10-2019-0107891 filed on Sep. 2, 2019, in the Korean Intellectual Property Office, the disclosure of which is incorporated herein by reference.

BACKGROUND

1. Field of the Invention

The present invention relates to a Pt—N—C based electrochemical catalyst for chlorine evolution reaction and a production method thereof, and more specifically, to a Pt—N—C based electrochemical catalyst which can be used in the chlorine evolution reaction of a chlor-alkali process, and a production method thereof.

2. Description of the Related Art

Chlorine ($Cl_2$), as an essential compound of thousands of consumer goods used in everyday life such as water treatment, plastics, medicine and medical supplies, insecticides, etc., has globally been receiving a high industrial attention. Most of the chlorine industrially used around the globe is generated through the chlor-alkali process, and main factors having an effect on generation of chlorine in the chlor-alkali process are largely divided into pH, temperature, electrolyte composition, reactor structure, electrode material, etc.

The electrode material among the main factors has been known to be the most important factor determining yield of chlorine generation and operating power consumption of the chlor-alkali process.

A mixed metal oxide (MMO) catalyst based on a precious metal such as ruthenium (Ru) or iridium (Jr) has currently been used as a catalyst of chlorine evolution reaction (CER) in most of chlor-alkali processes, and problems including a nonuniform catalytic activity and a high activity with respect to an oxygen generating side reaction exist in such an MMO catalyst.

Particularly, since generated oxygen causes unnecessary power consumption, and is reacted with hydrogen such that an explosive gas mixture can be produced, the development of a catalyst having a high selectivity in the chlorine evolution reaction is required.

Further, since a large amount of precious metal is still required to maintain activity in the chlorine evolution reaction, a used amount of the precious metal needs to be minimized by maximizing utilization efficiency of the precious metal.

Most of research results that have been reported up to now include research results of changing or adjusting compositions or contents of metal oxides of a chlorine evolution electrode catalyst.

Meanwhile, although an atomic dispersion catalyst or a monoatomic catalyst has recently been sought to maximize utilization efficiency of the precious metal, a catalyst dispersed into atomic units has not been used yet as an electrochemical catalyst of the chlorine evolution reaction.

SUMMARY

In order to solve the above-mentioned problems, the purpose of the present invention is to provide an electrochemical catalyst for chlorine evolution reaction, the electrochemical catalyst exhibiting high activity and selectivity while including a minimum amount of precious metal, and a production method thereof.

However, an object to be accomplished by the present invention is not limited to the above-mentioned object, and other objects not mentioned will be understood by those skilled in the art from the following description.

An aspect of the present invention provides a Pt—N—C based electrochemical catalyst including: a carbon support; and an organic compound including Pt and N distributed on the carbon support.

According to an embodiment, the carbon support may include at least one selected from the group consisting of carbon nanotube, carbon nanofiber, graphene, reduced graphene oxide (rGO), and carbon black.

According to an embodiment, the organic compound may include a macrocyclic compound, and the macrocyclic compound may include at least one selected from the group consisting of porphyrin, phthalocyanine, corrole, cyclam, and tetraazaannulene.

According to an embodiment, the organic compound may include at least one selected from the group consisting of phenanthroline, cyanamide, ethylenediamine, pyridine, pyrrole, aniline, pyrazine, purine, imidazole, triazine, amino acid, nucleobase, and polyaniline. According to an embodiment, the organic compound may include a $Pt-N_X$ site (here, X is 4 or 6).

According to an embodiment, the Pt may be dispersed in a monoatomic unit.

According to an embodiment, the Pt may have a particle diameter of 0.5 nm or less.

According to an embodiment, the Pt may be included in an amount of 0.1 wt % to 3 wt % in the Pt—N—C based electrochemical catalyst.

According to an embodiment, the Pt—N—C based electrochemical catalyst may have a selectivity of chlorine evolution reaction to oxygen evolution reaction of 95% or more at a chlorine evolution electrode of a chlor-alkali water electrolysis device.

The other aspect of the present invention provides a production method of a Pt—N—C based electrochemical catalyst, the production method including the steps of: mixing a carbon support with a Pt—N precursor including Pt and N to obtain a carbon support mixture; and heat-treating the carbon support mixture.

According to an embodiment, the Pt—N precursor includes a macrocyclic compound including a Pt—N coordination, and the macrocyclic compound including the Pt—N coordination may include at least one selected from the group consisting of platinum porphyrin and its derivatives, platinum phthalocyanine and its derivatives, platinum corrole and its derivatives, platinum cyclam and its derivatives, and platinum tetraazaannulene and its derivatives.

According to an embodiment, the Pt—N precursor may include $Pt^{2+}$ Tetraphenylporphyrin ($Pt^{II}TPP$).

According to an embodiment, the Pt—N precursor includes a platinum-organic compound including a Pt—N coordination, and the platinum-organic compound may include at least one selected from the group consisting of a platinum-phenanthroline complex and its derivatives, a platinum-cyanamide complex and its derivatives, a platinum-ethylenediamine complex and its derivatives, a platinum-pyridine complex and its derivatives, a platinum-pyrrole complex and its derivatives, a platinum-aniline complex and its derivatives, a platinum-pyrazine complex and its derivatives, a platinum-purine complex and its derivatives, a platinum-imidazole complex and its derivatives, a platinum-triazine complex and its derivatives, a platinum-amino acid complex and its derivatives, a platinum-nucleobase complex and its derivatives, and a platinum-polyaniline complex and its derivatives.

According to an embodiment, the carbon support mixture may include less than 5 wt % of the Pt.

According to an embodiment, the step of heat-treating the carbon support mixture may be performed at a temperature of 300° C. to 1,000° C.

A Pt—N—C based electrochemical catalyst according to the present invention has effects that the catalyst has an excellent catalytic activity and a high selectivity with respect to chlorine evolution reaction, and can improve durability of an electrode by uniformly dispersing platinum in an atomic unit.

In addition, a Pt—N—C based electrochemical catalyst according to the present invention has effects that the catalyst maximizes utilization efficiency of the platinum atom, and can minimize oxidation of the surface of the electrode.

Furthermore, a production method of a Pt—N—C based electrochemical catalyst according to the present invention has an effect of enabling the catalyst to be easily produced by a simple process of mixing a carbon support with a Pt—N precursor, and heat-treating a mixture of the carbon support with the Pt—N precursor at a predetermined temperature.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
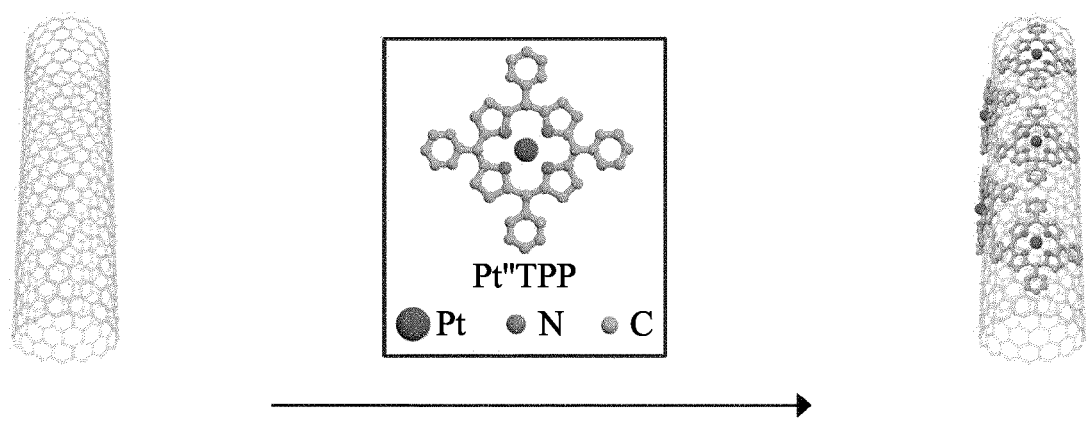
FIG. 1 briefly illustrates a production process of an electrochemical catalyst according to the present invention.

Hereinafter, embodiments will be described in detail with reference to the accompanying drawings. However, since various changes may be applied to the embodiments, the scope of patent application is not restricted or limited by such embodiments. All the modifications, equivalents, and replacements for the embodiments should be understood to be included in the scope of the patent application.

Terms used in the embodiments have been used for the purpose of explanation only, and the terms should not be interpreted as an intention of limiting the explanation. An expression of the singular number includes an expression of the plural number unless clearly defined otherwise in the context. In the present specification, it should be understood that a term such as "includes" or "having" is used to specify existence of a feature, a number, a step, an operation, a constituent element, a part, or a combination thereof described in the specification, but it does not preclude the possibility of the existence or addition of one or more other features, numbers, steps, operations, constituent elements, parts, or combinations thereof.

Unless otherwise defined, all terms, including technical and scientific terms, used herein have the same meaning as commonly understood by one of ordinary skill in the art to which embodiments pertain. Terms, such as those defined in commonly used dictionaries, should be interpreted as having meanings that are consistent with those in the context of the related art but are not interpreted as having ideal or excessively formal meanings unless clearly defined in the present invention.

Further, in describing the present invention with reference to the accompanying drawings, like elements will be referenced by like reference numerals or signs regardless of the drawing numbers, and description thereof will not be repeated. In describing embodiments, when it is determined that a detailed description of related known techniques unnecessarily obscures the gist of the embodiments, the detailed description thereof will be omitted.

Hereinafter, a Pt—N—C based electrochemical catalyst according to the present invention and a production method thereof will be described in detail with reference to embodiments and drawings. However, the present invention is not limited to such embodiments and drawings.

An aspect of the present invention provides a Pt—N—C based electrochemical catalyst including: a carbon support; and an organic compound including Pt and N distributed on the carbon support.

According to an embodiment, the Pt—N—C based electrochemical catalyst may be a Pt—N—C based electrochemical catalyst for chlorine evolution reaction, and more specifically a Pt—N—C based electrochemical catalyst for chlorine evolution reaction (CER) of a chlor-alkali water electrolysis device.

The chlor-alkali water electrolysis device is a main technology of chlorine, caustic soda and hydrogen production plants, and electrochemical reaction of the chlor-alkali water electrolysis device is carried out as follows.

$2H_2O+2e^- \rightarrow H_2+2OH^-$ (Hydrogen evolution reaction, HER)    Anode:

$2Cl^- \rightarrow Cl_2 + 2e^-$ (chlorine evolution reaction, CER) Cathode:

$2H_2O + 2Cl^- \rightarrow H_2 + 2OH^-$ Whole reaction:

A Pt—N—C based electrochemical catalyst according to the present invention can be used as a chlorine evolution electrode catalyst, i.e., a core part of the chlor-alkali water electrolysis device, and particularly has characteristics of showing high selectivity in the chlorine evolution reaction.

Specifically, the chlorine evolution electrode catalyst of the chlor-alkali water electrolysis device may generate oxygen by reacting with water, and the generated oxygen not only causes degradation of an active site, but also is combined with permeable hydrogen ($H_2$) to form an explosive gas mixture. Therefore, an electrochemical catalyst showing high selectivity in the chlorine evolution reaction is required in order to prevent this.

A Pt—N—C based electrochemical catalyst according to the present invention has effects that it can solve a problem caused by evolution of oxygen, has an excellent catalytic activity, and can improve durability of an electrode by showing high selectivity in chlorine evolution.

According to an embodiment, the carbon support may include at least one selected from the group consisting of carbon nanotube, carbon nanofiber, graphene, reduced graphene oxide (rGO), and carbon black.

Here, the carbon black may include at least one selected from the group consisting of Ketjen black (KB), Vulcan, acetylene black (AB), printex, and black pearl.

According to an embodiment, the organic compound may be a complex in which Pt and N are coordinate-bonded.

According to an embodiment, the organic compound may form a structure which has Pt positioned in the center thereof, and in which N atoms are disposed in a square form.

According to an embodiment, the organic compound may include a macrocyclic compound, and the macrocyclic compound may include at least one selected from the group consisting of porphyrin, phthalocyanine, corrole, cyclam, and tetraazaannulene.

According to an embodiment, the organic compound may include at least one selected from the group consisting of phenanthroline, cyanamide, ethylenediamine, pyridine, pyrrole, aniline, pyrazine, purine, imidazole, triazine, amino acid, nucleobase, and polyaniline.

According to an embodiment, the organic compound includes a complex molecule formed by bonding between metal and a heteroatom and shows a maximized catalyst utilization rate as an active site of the catalyst.

According to an embodiment, the organic compound may include a Pt—$N_X$ site.

According to an embodiment, the X may be 4 or 6.

Here, the Pt—$N_X$ site may exhibit a catalytic activity not less than 3 times higher than a general Pt nanoparticle catalyst by acting as a catalytic active site.

Further, the Pt—$N_X$ site may act as an active site in chlorine evolution reaction without competing with surface oxidation or oxygen evolution reaction in a chlorine evolution electrode.

According to an embodiment, the organic compound may include a Pt—$N_4$ site.

Here, the Pt—$N_4$ site may act as a catalytic active site.

The organic compound including the Pt—$N_4$ site exhibits a high selectivity to the chlorine evolution reaction by having low free energy with respect to chlorine evolution reaction and by having high free energy with respect to oxygen evolution reaction.

Further, the organic compound including the Pt—$N_4$ site has high electrochemical stability since a difference between adsorption energy and cohesive energy is low.

According to an embodiment, the Pt may be dispersed in a monoatomic unit.

A Pt—N—C based electrochemical catalyst according to the present invention has merits that it can maximize utilization efficiency of Pt corresponding to precious metal, and can obtain high catalytic activity even with a small amount of addition by dispersing Pt in a monoatomic unit.

Further, the Pt dispersed in a monoatomic unit may induce a reaction path different from a Pt nanoparticle catalyst generally used and may induce specific selectivity and activity with respect to many electrocatalytic reactions including oxygen reduction reaction, hydrogen evolution reaction, and fuel oxidation reaction. According to an embodiment, the Pt may be dispersed in a monoatomic unit as a Pt—N site exists in the organic compound, and the organic compound is dispersed in a state that the Pt—N site is maintained.

Here, since a length between Pt and N is constantly maintained as the Pt—N site is maintained in the organic compound, the Pt may obtain an effect that it is uniformly dispersed in a monoatomic unit.

According to an embodiment, the Pt may have a particle diameter of 0.5 nm or less. The Pt having a particle diameter of 0.5 nm or less is contrasted with a Pt nanoparticle catalyst generally produced by hydrogen treatment having a particle diameter of 1 nm to 5 nm.

According to an embodiment, the Pt—N—C based electrochemical catalyst may exhibit a catalyst reaction frequency (turnover frequency, TOF) not less than 5 times high compared to chlorine evolution overvoltage at an overvoltage of 60 mV by comparing with the Pt nanoparticle catalyst.

According to an embodiment, the Pt—N—C based electrochemical catalyst may include 0.1 wt % to 3 wt % of the Pt.

The Pt—N—C based electrochemical catalyst may include preferably 0.1 wt % to 2 wt %, more preferably 0.5 wt % to 2 wt %, and even more preferably 0.5 wt % to 1 wt % of the Pt.

A sufficient catalytic activity may not be exhibited if the Pt—N—C based electrochemical catalyst includes less than the above-mentioned amount range of the Pt, and a price increase of the catalyst may be caused by unnecessary use of the Pt, i.e., a precious metal if the Pt—N—C based electrochemical catalyst includes more than the above-mentioned amount range of the Pt.

According to an embodiment, the Pt—N—C based electrochemical catalyst may have a selectivity of chlorine evolution reaction to oxygen evolution reaction of 95% or more in a chlorine evolution electrode of a chlor-alkali water electrolysis device.

This means that 95% or more of current is consumed in chlorine evolution during driving of the catalyst. According to an embodiment, the Pt—N—C based electrochemical catalyst may have a selectivity of chlorine evolution reaction to oxygen evolution reaction of 97% or more in a chlorine evolution electrode of a chlor-alkali water electrolysis device.

A Pt—N—C based electrochemical catalyst according to the present invention may prevent side effects due to oxygen evolution reaction and may exhibit excellent catalytic activity by showing a high selectivity with respect to the chlorine evolution reaction.

A selectivity of the Pt—N—C based electrochemical catalyst to the chlorine evolution reaction is equally maintained even when chlorine ions exist at a low concentration of 0.1 M to 0.5 M. According to an embodiment, the Pt—N—C based electrochemical catalyst may not produce current when the chlorine ions are absent.

According to an embodiment, the Pt—N—C based electrochemical catalyst may allow current to be maintained to 70% or more of an initial current after operation of a chlorine evolution electrode for 12 hours.

Compared to this, a catalyst in which Pt nanoparticles are mixed with a carbon support maintains current to 50% of the initial current after operation of the chlorine evolution electrode for 12 hours, and exhibits a severe degradation phenomenon.

On the other hand, a Pt—N—C based electrochemical catalyst according to the present invention improves durability of the electrode and may secure durability which is equal to or higher than a commercially available mixed metal oxide (MMO) catalyst by maintaining current to 70% or more of the initial current after operation of the chlorine evolution electrode for 12 hours.

The other aspect of the present invention provides a method of producing a Pt—N—C based electrochemical catalyst, the method including the steps of: mixing a carbon support with a Pt—N precursor including Pt and N to obtain a carbon support mixture; and heat-treating the carbon support mixture.

A method of producing a Pt—N—C based electrochemical catalyst according to the present invention is characterized in that the method is progressed by a simple process of mixing and heat treatment steps, and the Pt—N—C based electrochemical catalyst is produced without destruction of a Pt—N precursor center.

A method of producing a Pt—N—C based electrochemical catalyst according to the present invention includes the step of mixing a carbon support with a Pt—N precursor including Pt and N to obtain a carbon support mixture.

According to an embodiment, the carbon support may include at least one selected from the group consisting of carbon nanotube, carbon nanofiber, graphene, reduced graphene oxide (rGO), and carbon black.

According to an embodiment, the Pt—N precursor includes a macrocyclic compound including a Pt—N coordination, and the macrocyclic compound including the Pt—N coordination may include at least one selected from the group consisting of platinum porphyrin and its derivatives, platinum phthalocyanine and its derivatives, platinum corrole and its derivatives, platinum cyclam and its derivatives, and platinum tetraazaannulene and its derivatives.

According to an embodiment, the Pt—N precursor may include $Pt^{2+}$ Tetraphenylporphyrin ($Pt^{II}TPP$).

According to an embodiment, the Pt—N precursor includes a platinum-organic compound including a Pt—N coordination, and the platinum-organic compound may include at least one selected from the group consisting of a platinum-phenanthroline complex and its derivatives, a platinum-cyanamide complex and its derivatives, a platinum-ethylenediamine complex and its derivatives, a platinum-pyridine complex and its derivatives, a platinum-pyrrole complex and its derivatives, a platinum-aniline complex and its derivatives, a platinum-pyrazine complex and its derivatives, a platinum-purine complex and its derivatives, a platinum-imidazole complex and its derivatives, a platinum-triazine complex and its derivatives, a platinum-amino acid complex and its derivatives, a platinum-nucleobase complex and its derivatives, and a platinum-polyaniline complex and its derivatives.

According to an embodiment, the carbon support mixture may include less than 5 wt % of the Pt.

If the carbon support mixture includes more than 5 wt % of the Pt, a Pt agglomeration phenomenon may occur, and a used amount of Pt, i.e., the precious metal is increased such that a price increase of the catalyst may be caused.

A method of producing a Pt—N—C based electrochemical catalyst according to the present invention includes the step of heat-treating the carbon support mixture.

Here, the heat treatment (annealing) process improves electrical conductivity between the carbon support and the Pt—N precursor in the carbon support mixture, and improves activity of the catalyst accordingly. Further, the heat treatment (annealing) process allows the Pt center of the active site to be activated in the chlorine evolution reaction by partially reducing a Pt center of an active site.

In general, a high-temperature pyrolysis process required for the formation of an active site of a catalyst has problems of reducing activity of the catalyst and producing crystalline metal particles. Alternatively, the Pt—N—C based electrochemical catalyst produced according to the present invention does not generate crystalline Pt and has a catalytic activity-improved effect compared to a Pt nanoparticle catalyst by maintaining a Pt—N site of a precursor even in a high-temperature heat treatment process.

According to an embodiment, the method of producing the Pt—N—C based electrochemical catalyst may preserve chemical structure and state of a Pt—N precursor even after a heat treatment step.

According to an embodiment, the method of producing the Pt—N—C based electrochemical catalyst may prevent occurrence of a change in chemical species of Pt even after the heat treatment step. For example, the chemical species of Pt may be maintained to $Pt^{2+}$ after the heat treatment step. Alternatively, a change in the chemical species of a Pt nanoparticle catalyst occurs as various chemical species including $Pt^0$, $Pt^{2+}$ and $Pt^{4+}$ are found after the heat treatment step.

Therefore, an electrochemical catalyst according to the present invention can obtain a high activity catalyst of a form in which Pt is dispersed in a monoatomic unit by improving electrical conductivity through the heat treatment step, and preserving chemical structure and state of the Pt—N precursor as they are.

According to an embodiment, the heat treatment step may be performed in a temperature range of 300° C. to 1,000° C.

When the heat treatment step is performed at a temperature less than the above-mentioned temperature range, catalytic activity may be lowered as electrical conductivity between the carbon support and the Pt—N precursor is lowered. When the heat treatment step is performed at a temperature more than the above-mentioned temperature range, the catalytic activity may be lowered as changes in a $Pt-N_X$ site of the Pt—N precursor or chemical species of Pt are caused.

Preferably, the heat treatment step may be performed in a temperature range of 500° C. to 800° C., and catalytic activity for chlorine evolution reaction may be maximized within the above temperature range.

According to an embodiment, the heat treatment step may be progressed under a nitrogen ($N_2$) atmosphere.

An electrochemical catalyst according to the present invention is characterized in that Pt is uniformly dispersed in a monoatomic unit, a Pt agglomeration phenomenon does not occur as a Pt—$N_X$ site of the Pt—N precursor is maintained within the catalyst as it is even in case of a high temperature heat treatment process.

Hereinafter, the present invention will be described more in detail with reference to Examples and Comparative Example. However, the following Examples are to illustrate the present invention, and the present invention is not limited to the following Examples.

Example 1

After mixing a Pt—N precursor ($Pt^{2+}$ meso-tetraphenylporphyrin, PtTPP) with an acid-treated carbon nanotube (CNT), a $Pt_1$/CNT catalyst was produced by heat-treating the mixture to a temperature of 700° C. under a nitrogen ($N_2$) atmosphere.

Here, the mixing process was performed such that the mixture includes 3 wt % of Pt based on a total mixture obtained by mixing the Pt—N precursor with the carbon nanotube.

FIG. 1 briefly illustrates a production process of an electrochemical catalyst according to the present invention.

Referring to FIG. 1, it can be understood that the $Pt_1$/CNT catalyst has a form in which platinum is dispersed in a monoatomic unit since a $Pt_1$/CNT catalyst produced by heat-treating the $Pt^{II}$TPP precursor-introduced carbon nanotube support after introducing a $Pt^{II}$TPP precursor to a carbon nanotube support has an active site of Pt—$N_4$ as it is.

Example 2

A catalyst was produced in the same manner as in Example 1 except that the heat treatment process was performed at a temperature of 500° C.

Example 3

A catalyst was produced in the same manner as in Example 1 except that the heat treatment process was performed at a temperature of 600° C.

Example 4

A catalyst was produced in the same manner as in Example 1 except that the heat treatment process was performed at a temperature of 800° C.

Comparative Example 1

A PtNP/CNT catalyst was produced in the same manner as in Example 1 except that platinum nanoparticles manufactured by performing a hydrogen treatment process were mixed instead of the Pt—N precursor.

Experimental Example 1

After observing the $Pt_1$/CNT catalyst produced in Example 1 and the PtNP/CNT catalyst produced in Comparative Example 1 with a High-angle annular dark-field scanning transmission electron microscope (HAADF-STEM), dispersion of atom was confirmed through a platinum particle size distribution chart.

Figure 2:
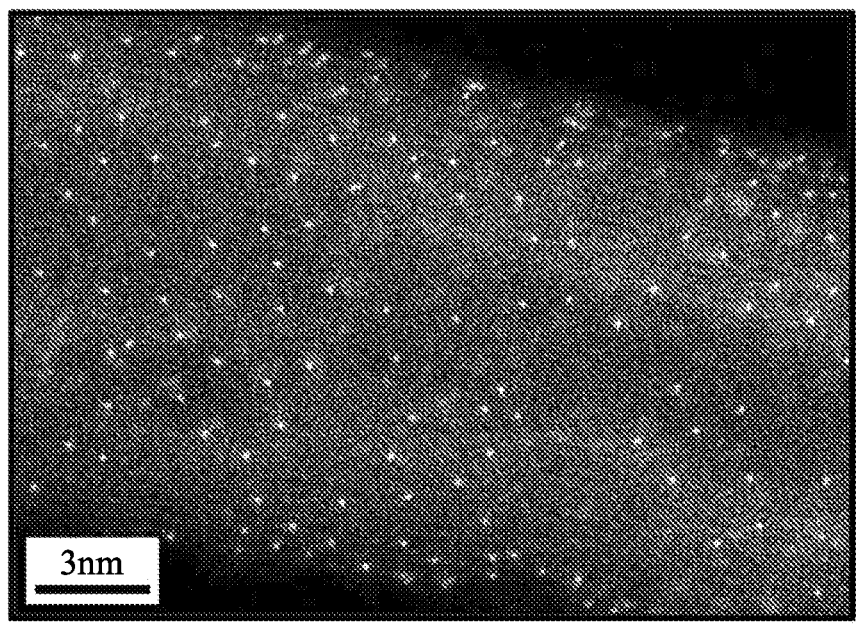
FIG. 2 is a High-angle annular dark-field scanning transmission electron microscope (HAADF-STEM) image of a $Pt_1$/CNT catalyst of Example 1.
Figure 3:
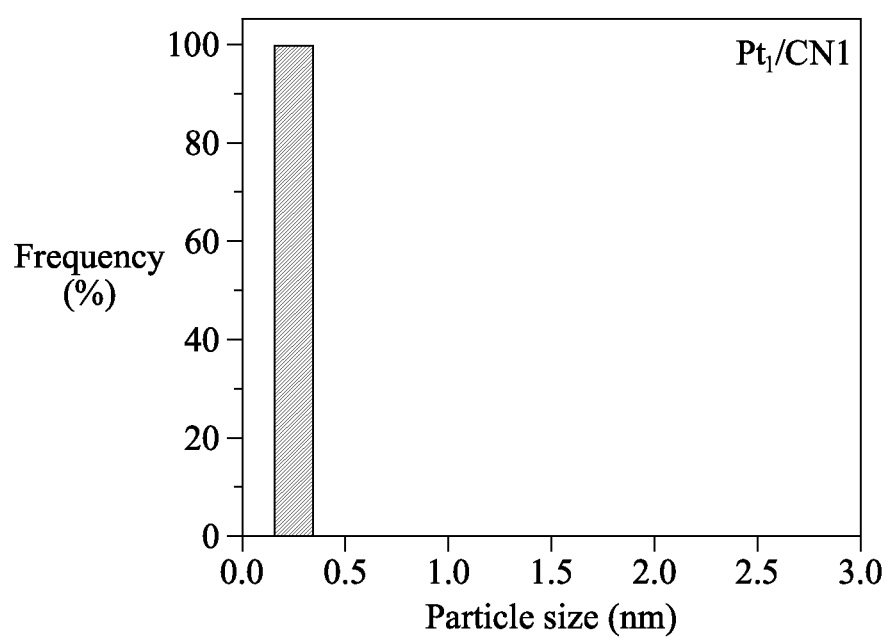
FIG. 3 is a platinum particle size distribution chart of a $Pt_1$/CNT catalyst of Example 1.

FIG. 2 is a High-angle annular dark-field scanning transmission electron microscope (HAADF-STEM) image of a $Pt_1$/CNT catalyst of Example 1. FIG. 3 is a platinum particle size distribution chart of a $Pt_1$/CNT catalyst of Example 1. Referring to FIG. 2 and FIG. 3, a Pt—$N_4$ precursor which is uniformly dispersed in a monoatomic unit within the produced $Pt_1$/CNT catalyst can be confirmed, and it can be confirmed that a platinum agglomeration phenomenon does not occur. Further, it can be seen that platinum atoms with a diameter of 0.1 nm to 0.5 nm were formed.

Meanwhile, platinum nanoparticles with a diameter of 1 to 5 nm were formed in the PtNP/CNT catalyst produced in Comparative Example 1.

Experimental Example 2

In order to confirm a geometrical structure around Pt atom, extended X-ray absorption fine structure (EXAFS) analysis and X-ray absorption near edge structure (XANES) analysis were carried out.

Figure 4A:
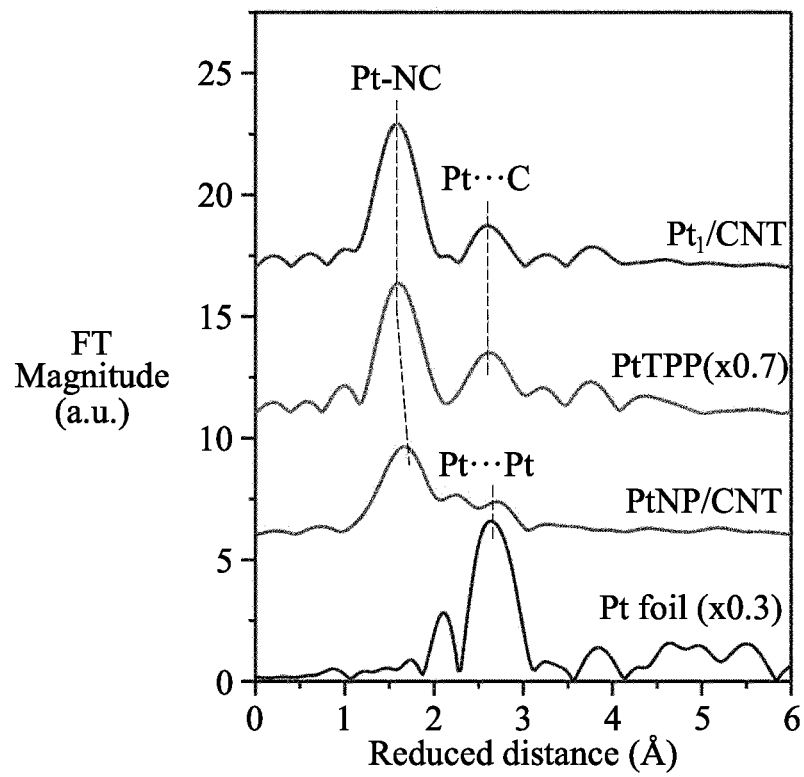
FIG. 4A is platinum's $L_3$-edge EXAFS spectrums analyzed by using Example 1 ($Pt_1$/CNT), a Pt—N precursor, Comparative Example 1 (PtNP/CNT), and a Pt foil.

FIG. 4A is platinum's $L_3$-edge EXAFS spectrums analyzed by using Example 1 ($Pt_1$/CNT), a Pt—N precursor, Comparative Example 1 (PtNP/CNT), and a Pt foil.

Figure 4B:
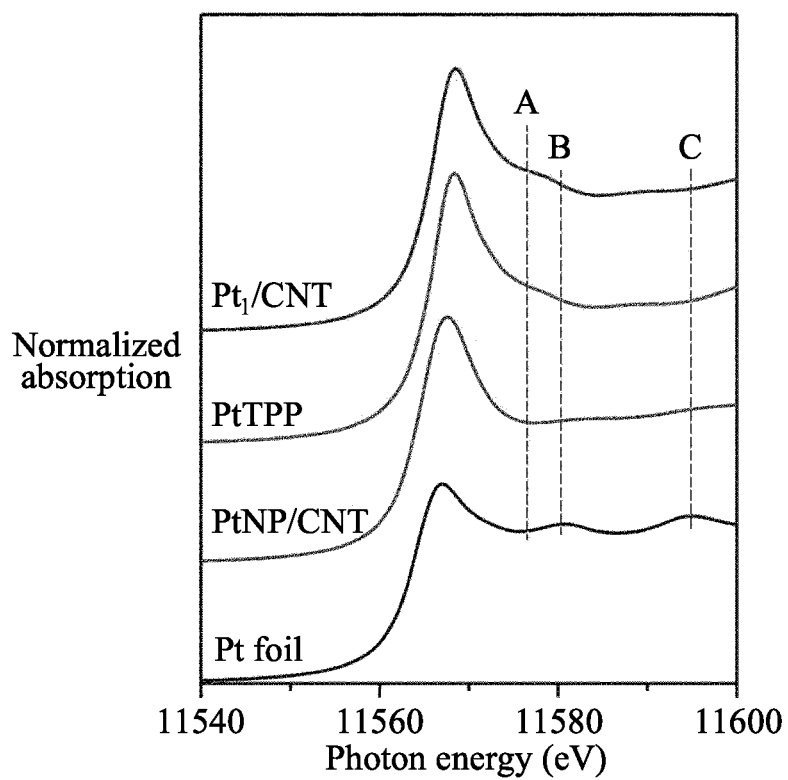
FIG. 4B is platinum's XANES spectrums analyzed by using Example 1 ($Pt_1$/CNT), a Pt—N precursor, Comparative Example 1 (PtNP/CNT), and a Pt foil.

FIG. 4B is platinum's XANES spectrums analyzed by using Example 1 ($Pt_1$/CNT), a Pt—N precursor, Comparative Example 1 (PtNP/CNT), and a Pt foil.

Referring to FIG. 4, it can be confirmed that Pt of the Pt—N precursor and a peripheral coordination configuration (Pt—$N_4$) are similarly shown in Example 1 ($Pt_1$/CNT) catalyst (a Pt—C peak of spectrum a and an A peak of spectrum b), and it can be confirmed that a Pt—Pt bond (B and C peaks of the spectrum b) shown in the Comparative Example 1 (PtNP/CNT) catalyst and the Pt foil is not found. Therefore, it can be seen that the Example 1 ($Pt_1$/CNT) catalyst has a Pt—$N_4$ active site of the Pt—N precursor as it is and is a form in which Pt is dispersed in a monoatomic unit.

Experimental Example 3

Platinum chemical species of Example 1 ($Pt_1$/CNT) and Comparative Example 1 (PtNP/CNT) were analyzed by performing 4f X-ray photoelectron spectroscopy (XPS) analysis.

Figure 5:
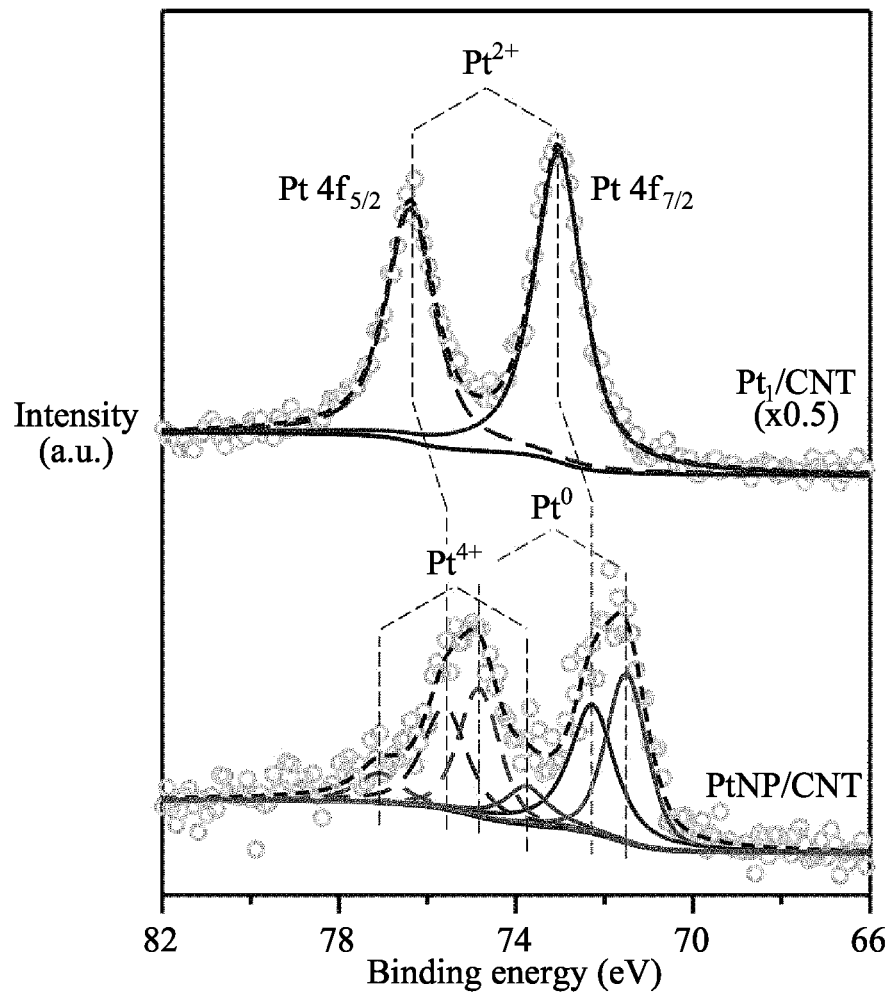
FIG. 5 is platinum 4f XPS spectrums of Example 1 ($Pt_1$/CNT) and Comparative Example 1 (PtNP/CNT)

FIG. 5 is platinum 4f XPS spectrums of Example 1 ($Pt_1$/CNT) and Comparative Example 1 (PtNP/CNT).

Referring to FIG. 5, it can be confirmed that, in the Example 1 ($Pt_1$/CNT) catalyst, only $Pt^{2+}$ chemical species are detected, and $Pt^0$ chemical species, i.e., characteristics of nanoparticles are not found.

On the other hand, it can be confirmed that various chemical species of $Pt^0$, $Pt^{2+}$ and $Pt^{4+}$ are detected in a platinum nanoparticle catalyst of Comparative Example 1 (PtNP/CNT). Therefore, it can be seen that the Example 1 ($Pt_1$/CNT) catalyst has a Pt—$N_4$ active site of the PtN precursor as it is, and is a form in which Pt is dispersed in a monoatomic unit.

Experimental Example 4

It was confirmed whether a crystalline platinum existed or not through a high-angle X-ray diffraction analysis of Example 1 ($Pt_1$/CNT), Comparative Example 1 (PtNP/CNT), and carbon nanotube (CNT).

Figure 6:
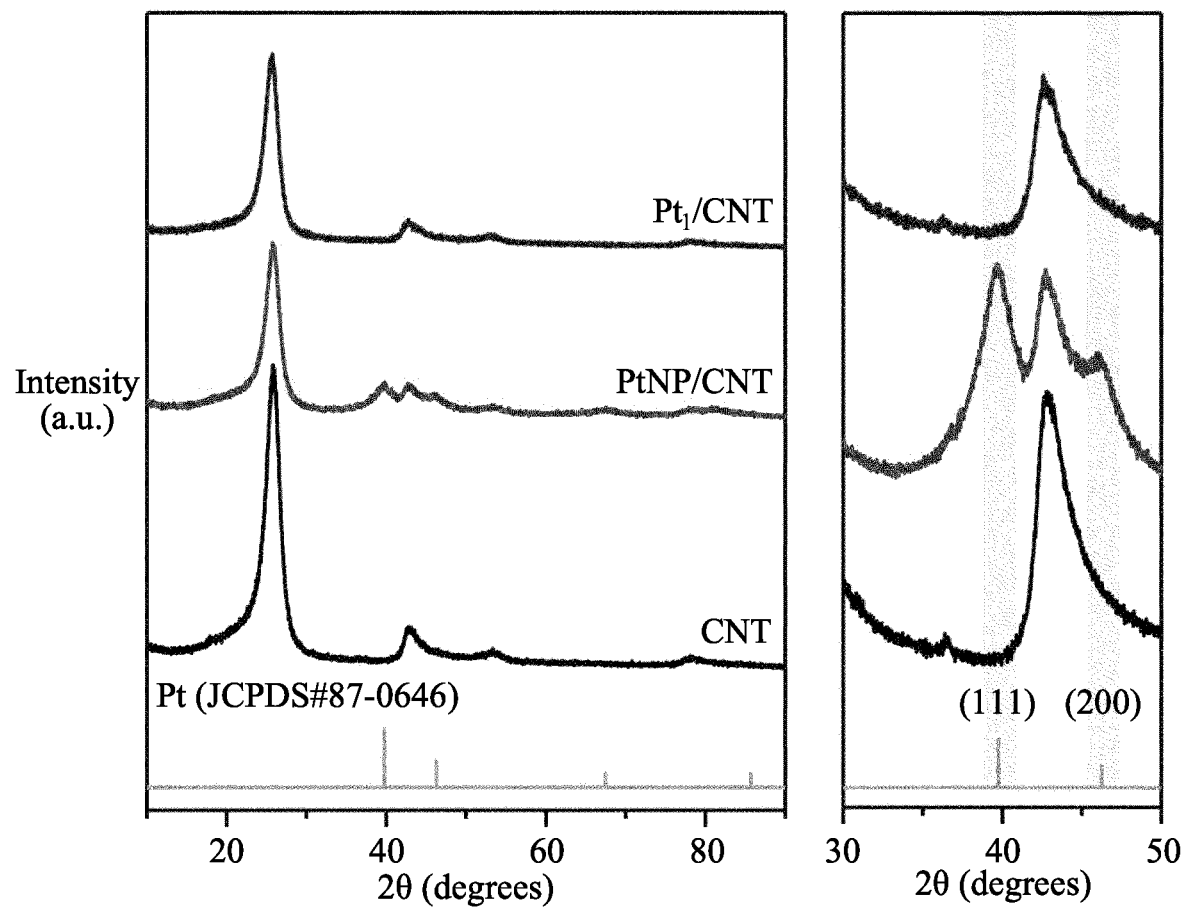
FIG. 6 is high angle x-ray diffraction analysis results of Example 1 ($Pt_1$/CNT), Comparative Example 1 (PtNP/CNT), and carbon nanotube (CNT)

FIG. 6 is high angle x-ray diffraction analysis results of Example 1 ($Pt_1$/CNT), Comparative Example 1 (PtNP/CNT), and carbon nanotube (CNT).

Referring to FIG. 6, it can be confirmed that, as with carbon nanotube (CNT) or a carbon nanoparticle catalyst of Comparative Example 1, platinum with crystallinity is not found in Example 1 ($Pt_1$/CNT) catalyst.

Therefore, it can be seen that a catalyst according to the present invention does not exhibit a platinum agglomeration phenomenon.

Experimental Example 5

In order to confirm changes in chemical species or structural changes according to heat treatment temperatures, 4f X-ray photoelectron spectroscopy (XPS) analysis, extended X-ray absorption fine structure (EXAFS) analysis and X-ray absorption near edge structure (XANES) analysis were each carried out by using the catalysts of Examples 1 to 4.

Figure 7A:
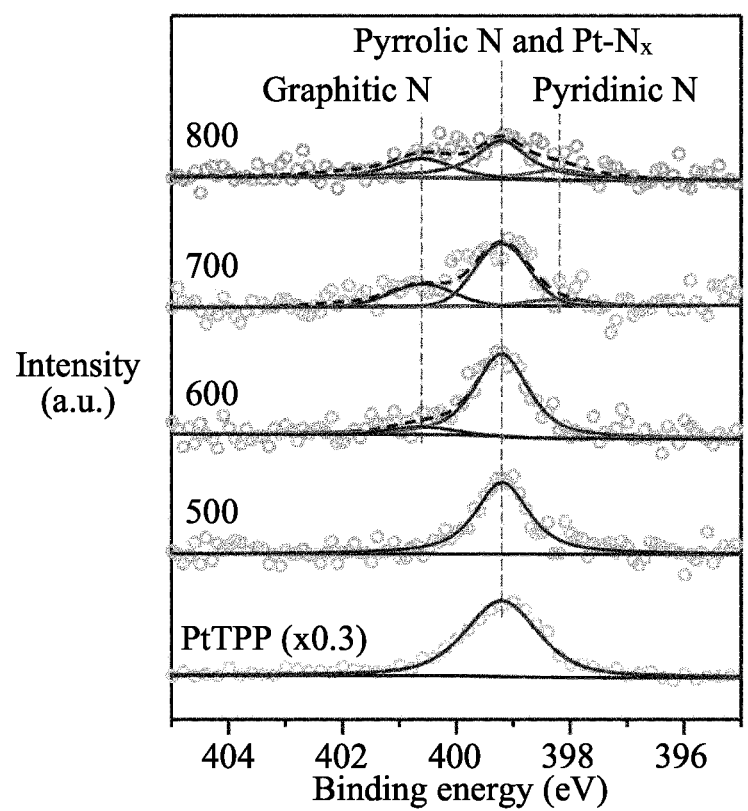
FIG. 7A is nitrogen is spectrums of the catalysts of Examples 1 to 4.

FIG. 7A is nitrogen is spectrums of the catalysts of Examples 1 to 4.

Figure 7B:
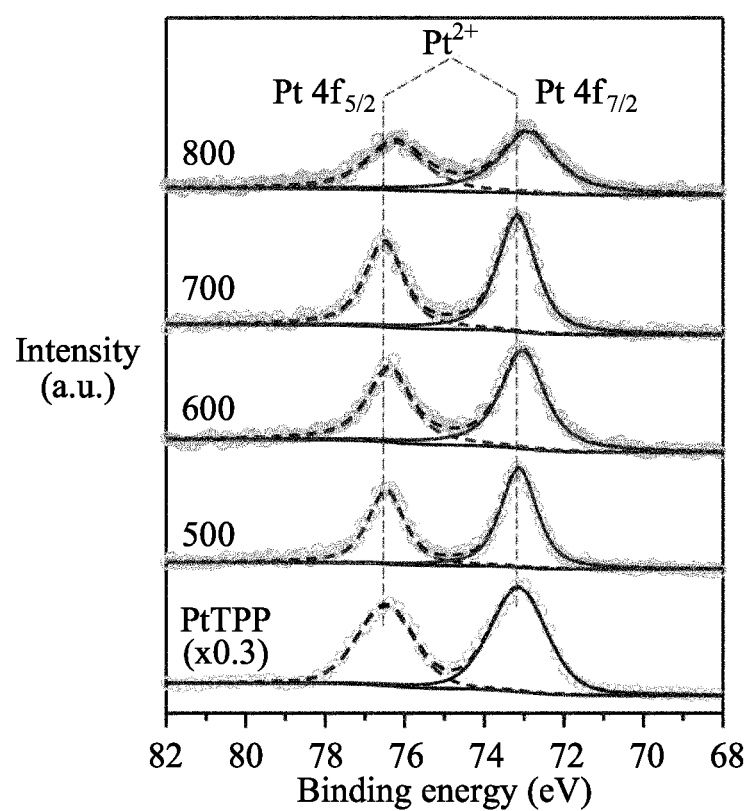
FIG. 7B is platinum 4f XPS spectrums of the catalysts of Examples 1 to 4.

FIG. 7B is platinum 4f XPS spectrums of the catalysts of Examples 1 to 4.

Referring to FIG. 7A, it can be confirmed that nitrogen in the catalysts is converted into other chemical species from 600° C.

Referring to FIG. 7B, it can be confirmed that all of platinum chemical species in the catalysts are maintained to $Pt^{2+}$ that is the same as the Pt—N precursor.

As a result, it can be seen that the platinum chemical species are still maintained even when synthesis temperatures are changed.

Figure 8A:
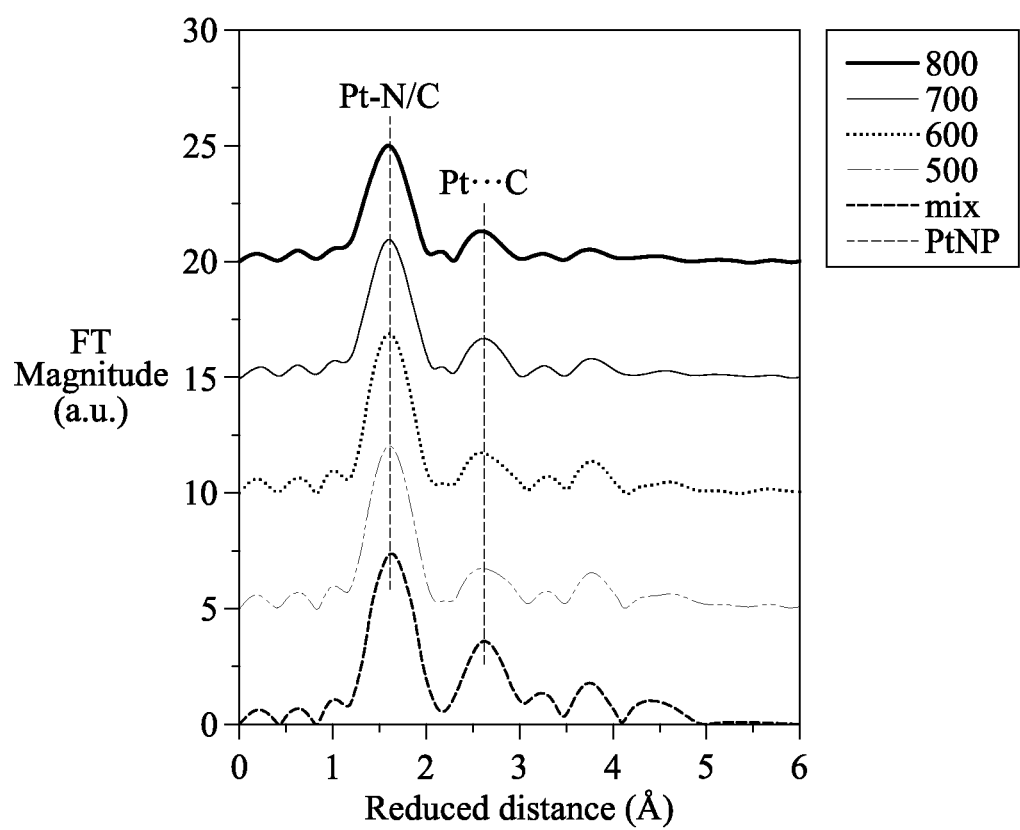
FIG. 8A is $L_3$-edge EXAFS spectrums of the catalysts of Examples 1 to 4.

FIG. 8A is $L_3$-edge EXAFS spectrums of the catalysts of Examples 1 to 4.

Figure 8B:
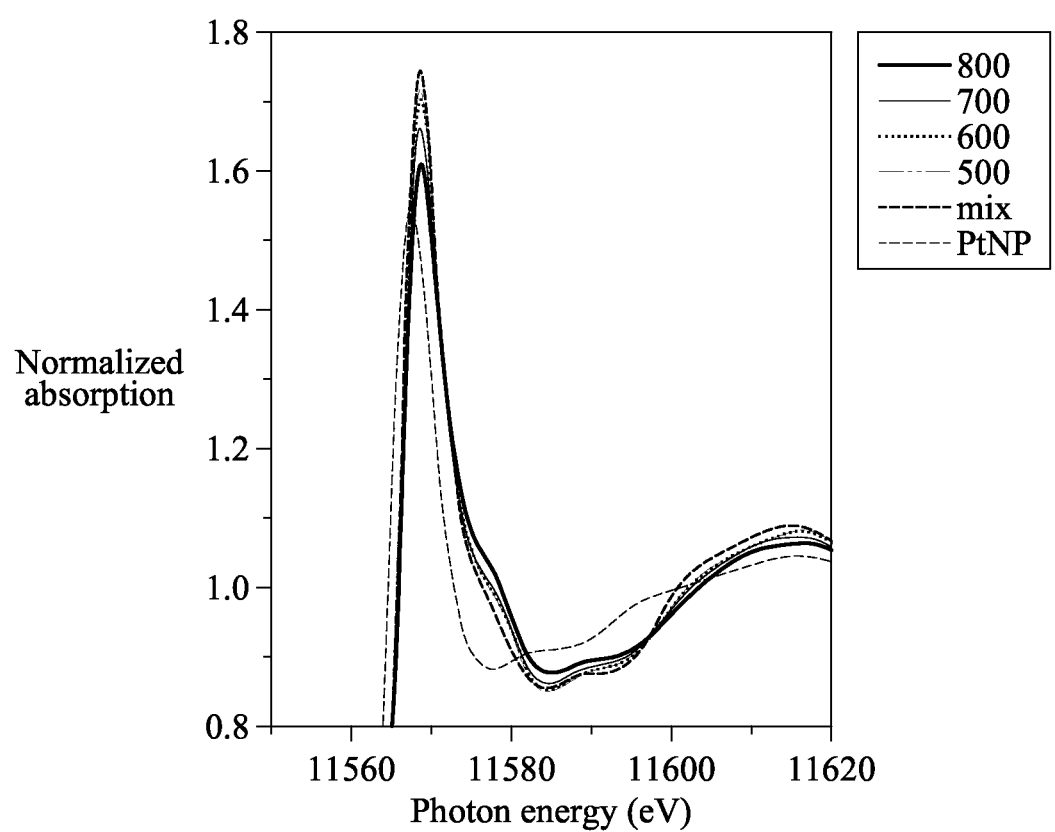
FIG. 8B is XANES spectrums of the catalysts of Examples 1 to 4.

FIG. 8B is XANES spectrums of the catalysts of Examples 1 to 4.

Referring to FIG. 8, it can be confirmed that an interatomic distance between Pt and N of the precursor and an oxidation number of platinum thereof exist by 800° C. without a significant change.

Accordingly, it can be seen in a catalyst according to the present invention that a form in which platinum is distributed in a monoatomic unit is maintained as a Pt—N bonding structure of the precursor is not broken even at high temperatures.

Experimental Example 6

In order to confirm activity of a catalyst according to the present invention, electrocatalytic ability values were examined from a rotating ring-disk electrode (RRDE) at 0.1 M $HClO_4$ under the presence and absence of 1.0 M $Cl^-$ by using each of Example 1 ($Pt_1$/CNT) catalyst, a commercial DSA (dimensionally stable anode), Comparative Example 1 (PtNP/CNT) catalyst and a carbon nanotube (CNT).

Figure 9A:
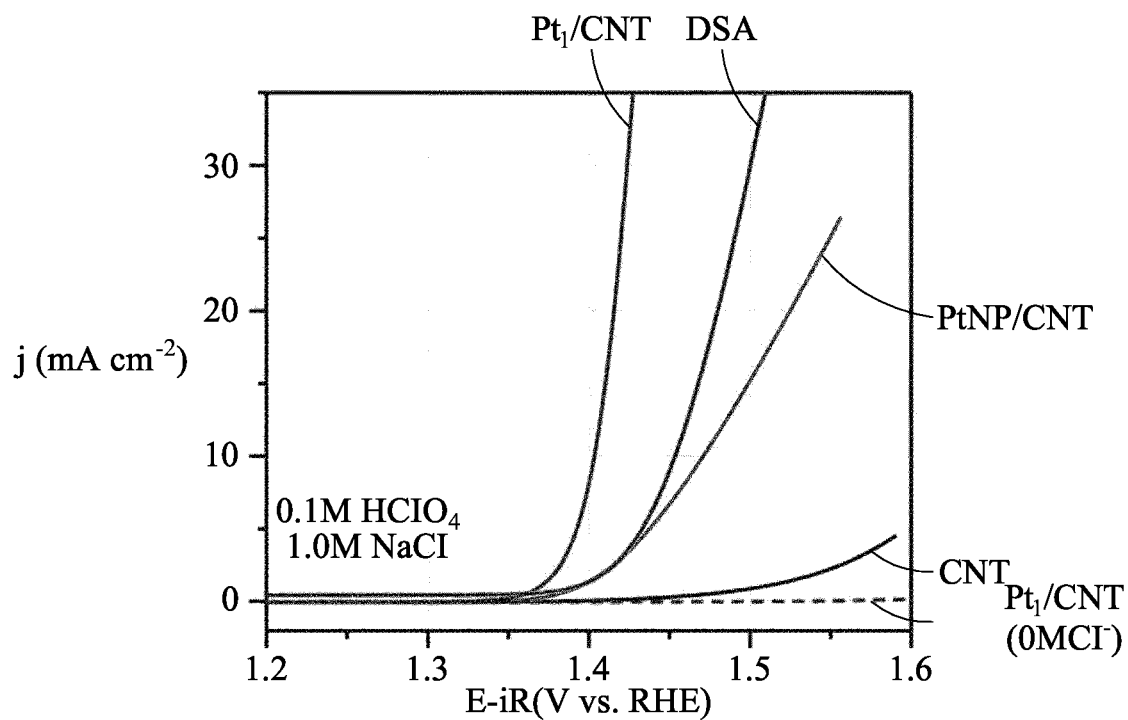
FIG. 9A is a polarization curve graph of a chlorine evolution catalyst.

FIG. 9A is a polarization curve graph of a chlorine evolution catalyst.

Figure 9B:
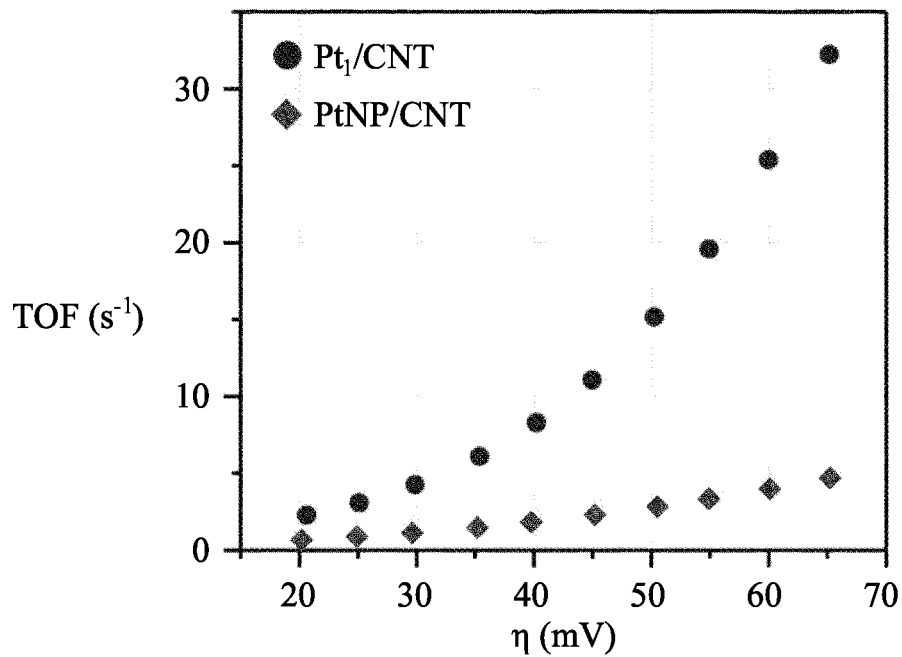
FIG. 9B is a catalyst reaction frequency (turnover frequency, TOF) graph compared to chlorine evolution overvoltage.

FIG. 9B is a catalyst reaction frequency (turnover frequency, TOF) graph compared to chlorine evolution overvoltage.

Referring to FIG. 9A, it can be confirmed that, as the higher current values (high j values) you see at low voltage values (low E iR values), the more excellent catalytic activities are, excellent catalytic activities are shown in the order of Example 1 ($Pt_1$/CNT) catalyst, DSA, Comparative Example 1 (PtNP/CNT) catalyst and CNT.

However, it can be confirmed that Example 1 ($Pt_1$/CNT) catalyst does not produce current when chlorine ions are absent.

Referring to FIG. 9B, it can be confirmed that, when calculating activity values (TOF) in contents of platinum exposed to the surface, a $PtN_4$ active site of Example 1 ($Pt_1$/CNT) catalyst exhibits an activity value at least three times higher than a platinum nanoparticle catalyst of Comparative Example 1.

Experimental Example 7

In order to confirm durability of a catalyst according to the present invention, current deterioration according to time when obtaining a specific current was observed by a chronoamperometry (CA) method using Example 1 catalyst, commercial DSA and Comparative Example 1 catalyst at an initial current density of 10 mA $cm^{-2}$.

Figure 10:
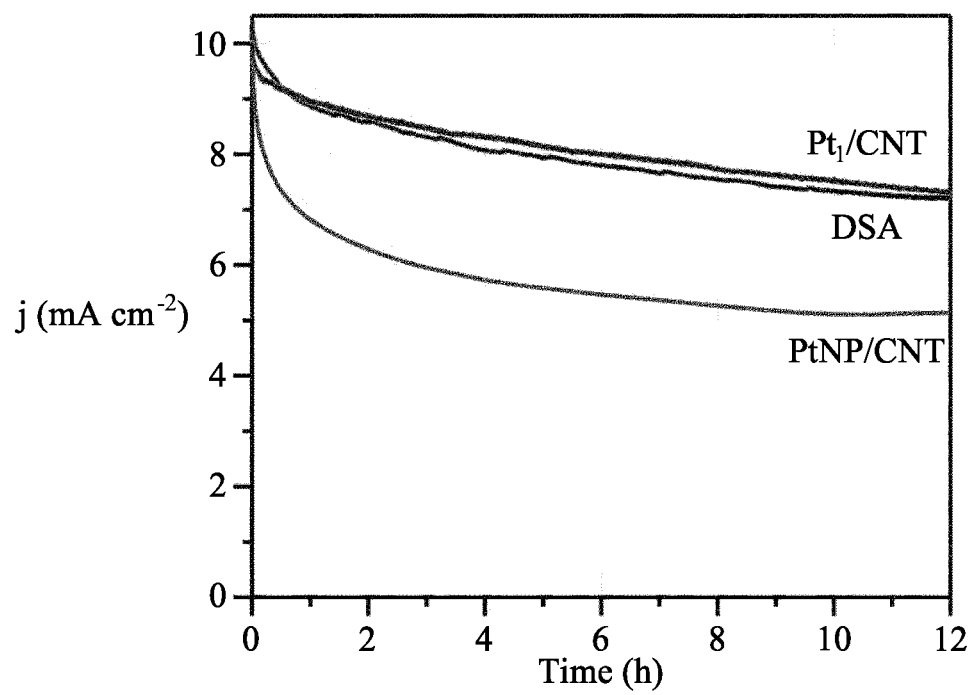
FIG. 10 is a graph comparing durability values of chlorine evolution catalysts according to driving time.

FIG. 10 is a graph comparing durability values of chlorine evolution catalysts according to driving time.

Referring to FIG. 10, it can be confirmed that electrochemical durability values are exhibited in the order of the Example 1 ($Pt_1$/CNT) catalyst (71.9%), DSA (69.3%) and Comparative Example 1 (PtNP/CNT) catalyst (51.0%), and values in parentheses indicate current amounts compared to an initial time after 12-hour driving.

Here, a severe degradation occurs in the catalyst of Comparative Example 1 since dissolution of platinum occurs as the formation of a chloro-platinum complex is accelerated even with a trace amount of $Cl^-$.

Meanwhile, the catalyst of Example 1 may have excellent durability since the formation of the chloro-platinum complex can be alleviated by a strong bond between platinum and nitrogen at a Pt—$N_4$ site.

Experimental Example 8

In order to confirm chlorine evolution reaction selectivity value of a catalyst according to the present invention, the chlorine evolution reaction selectivity value was observed by a chronoamperometry (CA) method using a rotating ring-disk electrode (RRDE).

Figure 11:
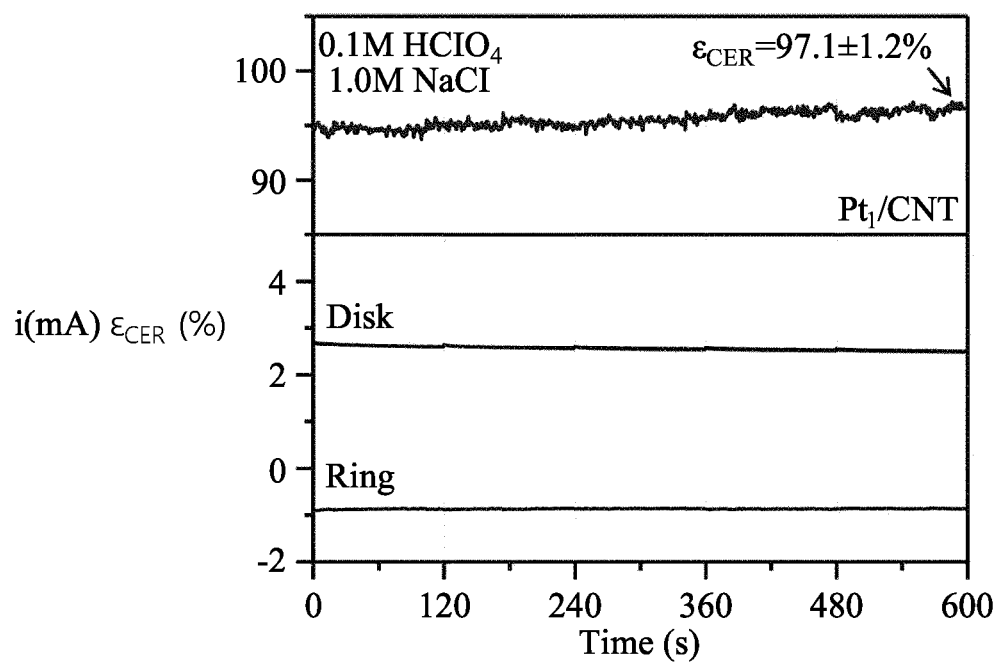
FIG. 11 is a graph of measuring chlorine evolution reaction selectivity value of a $Pt_1$/CNT catalyst of Example 1 using a rotating ring-disk electrode.

FIG. 11 is a graph of measuring chlorine evolution reaction selectivity value of a $Pt_1$/CNT catalyst of Example 1 using a rotating ring-disk electrode.

Referring to FIG. 11, it can be confirmed that 97.1% out of the total current value is consumed in chlorine evolution during driving of the catalyst.

Although the above-mentioned Examples have been described by limited drawings, those skilled in the art may apply various technical modifications and alterations based on the Examples. For example, appropriate results can be achieved although described techniques are carried out in a different order from a described method, and/or described elements are combined or mixed in a different form from the described method, or replaced or substituted with other elements or equivalents. Therefore, other implementations, other embodiments, and equivalents to patent claims belong to the scope of the patent claims to be described later.

What is claimed is:

1. A Pt—N—C based electrochemical catalyst comprising:
    a carbon support; and
    an organic compound including Pt and N distributed on the carbon support.

2. The Pt—N—C based electrochemical catalyst of claim 1, wherein the carbon support includes at least one selected from the group consisting of carbon nanotube, carbon nanofiber, graphene, reduced graphene oxide (rGO), and carbon black.

3. The Pt—N—C based electrochemical catalyst of claim 1, wherein the organic compound includes a macrocyclic compound, and the macrocyclic compound includes at least one selected from the group consisting of porphyrin, phthalocyanine, corrole, cyclam, and tetraazaannulene.

4. The Pt—N—C based electrochemical catalyst of claim 1, wherein the organic compound includes at least one selected from the group consisting of phenanthroline, cyanamide, ethylenediamine, pyridine, pyrrole, aniline, pyrazine, purine, imidazole, triazine, amino acid, nucleobase, and polyaniline.

5. The Pt—N—C based electrochemical catalyst of claim 1, wherein the organic compound includes a Pt—$N_X$ site (here X is 4 or 6).

6. The Pt—N—C based electrochemical catalyst of claim 1, wherein the Pt is dispersed in a monoatomic unit.

7. The Pt—N—C based electrochemical catalyst of claim 1, wherein the Pt has a particle diameter of 0.5 nm or less.

8. The Pt—N—C based electrochemical catalyst of claim 1, wherein the Pt is included in an amount of 0.1 wt % to 3 wt % in the Pt—N—C based electrochemical catalyst.

9. The Pt—N—C based electrochemical catalyst of claim 1, wherein the Pt—N—C based electrochemical catalyst has a selectivity of chlorine evolution reaction to oxygen evolution reaction of 95% or more at a chlorine evolution electrode of a chlor-alkali water electrolysis device.

10. A production method of a Pt—N—C based electrochemical catalyst, the production method comprising:
    mixing a carbon support with a Pt—N precursor including Pt and N to obtain a carbon support mixture; and
    heat-treating the carbon support mixture.

11. The production method of claim 10, wherein the Pt—N precursor includes a macrocyclic compound including a Pt—N coordination, and the macrocyclic compound including the Pt—N coordination includes at least one selected from the group consisting of platinum porphyrin and its derivatives, platinum phthalocyanine and its derivatives, platinum corrole and its derivatives, platinum cyclam and its derivatives, and platinum tetraazaannulene and its derivatives.

12. The production method of claim 10, wherein the Pt—N precursor includes $Pt^{2+}$Tetraphenylporphyrin ($Pt^{II}$TPP).

13. The production method of claim 10, wherein the Pt—N precursor includes a platinum-organic compound including a Pt—N coordination, and the platinum-organic compound includes at least one selected from the group consisting of a platinum-phenanthroline complex and its derivatives, a platinum-cyanamide complex and its derivatives, a platinum-ethylenediamine complex and its derivatives, a platinum-pyridine complex and its derivatives, a platinum-pyrrole complex and its derivatives, a platinum-aniline complex and its derivatives, a platinum-pyrazine complex and its derivatives, a platinum-purine complex and its derivatives, a platinum-imidazole complex and its derivatives, a platinum-triazine complex and its derivatives, a platinum-amino acid complex and its derivatives, a platinum-nucleobase complex and its derivatives, and a platinum-polyaniline complex and its derivatives.

14. The production method of claim 10, wherein the carbon support mixture includes less than 5 wt % of the Pt.

15. The production method of claim 10, wherein the heat-treating of the carbon support mixture is performed at a temperature of 300° C. to 1,000° C.

* * * * *